US012627402B2

(12) United States Patent
Park et al.

(10) Patent No.: US 12,627,402 B2
(45) Date of Patent: May 12, 2026

(54) ULTRA-RELIABLE MU-PPDU TRANSMISSION WITH NETWORK CODING

(71) Applicant: Intel Corporation, Santa Clara, CA (US)

(72) Inventors: Minyoung Park, San Ramon, CA (US); Wei Mao, San Jose, CA (US); Dave A. Cavalcanti, Portland, OR (US); Javier Perez-Ramirez, North Plains, OR (US); Hosein Nikopour, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/953,493

(22) Filed: Sep. 27, 2022

(65) Prior Publication Data

US 2023/0082330 A1     Mar. 16, 2023

(51) Int. Cl.
H04L 1/00      (2006.01)
H04W 84/12      (2009.01)

(52) U.S. Cl.
CPC .... H04L 1/0061 (2013.01); H04L 2001/0093 (2013.01); H04W 84/12 (2013.01)

(58) Field of Classification Search
CPC ................. H04L 1/0061; H04L 1/0076; H04L 2001/0093; H04W 84/12
See application file for complete search history.

(56) References Cited

U.S. PATENT DOCUMENTS

| | | | | |
|---|---|---|---|---|
| 2017/0244530 A1* | 8/2017 | Cariou | ..................... | H04L 1/18 |
| 2019/0268091 A1* | 8/2019 | Riani | .................... | H04L 1/0041 |
| 2019/0379485 A1* | 12/2019 | Jiang | ................. | H03M 13/2742 |
| 2020/0083983 A1* | 3/2020 | Chen | ..................... | H04L 1/0042 |
| 2020/0112878 A1* | 4/2020 | Liu | ..................... | H04W 28/04 |
| 2020/0145139 A1* | 5/2020 | Merlin | .................. | H04L 1/1812 |
| 2020/0228224 A1* | 7/2020 | Maltsev | ................ | H04L 1/0071 |
| 2021/0036809 A1* | 2/2021 | Shellhammer | ....... | H04B 7/0456 |
| 2021/0136735 A1* | 5/2021 | Lin | ........................ | H04W 74/04 |
| 2022/0278778 A1* | 9/2022 | Kim | ..................... | H04L 1/1819 |
| 2022/0303052 A1* | 9/2022 | Chen | ..................... | H04L 1/0009 |
| 2022/0385521 A1* | 12/2022 | Chen | ..................... | H04L 5/0044 |

* cited by examiner

*Primary Examiner* — Kenny S Lin
(74) *Attorney, Agent, or Firm* — Schwegman Lundberg & Woessner, P.A.

(57) ABSTRACT

A non-access point (AP) station (STA) may be configured for receipt of a multi-user physical layer protocol data unit (MU-PPDU) with network coding. The STA may decode at least portions of a MU-PPDU received from an access point (AP). The MU-PPDU may comprise a first data portion addressed to the STA, a second data portion addressed to a second STA2, and a parity portion addressed to both the stations. The parity portion may be generated by the AP based on a network coding of the first and second data portions. When the first data portion is received by the STA with errors, the STA may attempt to recover the first data portion using both the parity portion and the second data portion.

20 Claims, 10 Drawing Sheets

BSS

MU-PPDU with network coded parity packet

| Data 1 (User 1) | 1002 |
| Data 2 (User 2) | 1004 |
| Parity User 1 and 2 | 1006 |

MU-PPDU with network coded parity packet

| Data 1 | Data 2 | User 1    1102 |
| Data 3 | Parity 1 | User 2    1104 |
| Parity 2 | Parity 3 | User 1 and 2    1106 |

ULTRA-RELIABLE MU-PPDU TRANSMISSION WITH NETWORK CODING

TECHNICAL FIELD

Embodiments pertain to wireless communications. Some embodiments pertain to wireless networks including wireless local area networks (WLANs) and Wi-Fi networks including networks operating in accordance with the IEEE 802.11 family of standards. Some embodiments relate to extremely high throughput (EHT) communications.

BACKGROUND

Today more and more wireless applications require high reliability and low latency. WLANs and Wi-Fi networks, however, operate in unlicensed spectrum and in an unmanaged network environment, where interference from an adjacent network could cause packet losses. In such an environment, many retransmissions or duplicate transmissions may be needed to provide very high reliability, which degrades spectral efficiency. Thus there are general needs for systems and methods to provide higher-reliability.

DETAILED DESCRIPTION

The following description and the drawings sufficiently illustrate specific embodiments to enable those skilled in the art to practice them. Other embodiments may incorporate structural, logical, electrical, process, and other changes.

Portions and features of some embodiments may be included in, or substituted for, those of other embodiments. Embodiments set forth in the claims encompass all available equivalents of those claims.

Embodiments disclosed herein relate to the use network coding for a multi-user OFDMA packet (e.g., an MU PPDU) to enhance reliability of each user's data packet reception. These embodiments are described in more detail below.

Some embodiments are directed to multi-user physical layer protocol data units (MU-PPDUs) with network coding. Some embodiments are directed to a non-access point (AP) station (STA) configured for receipt of a multi-user physical layer protocol data unit (MU-PPDU) with network coding. In these embodiments, the STA may decode at least portions of a MU-PPDU received from an access point (AP). The MU-PPDU may comprise a first data portion addressed to the STA, a second data portion addressed to a second STA2, and a parity portion addressed to both the stations. The parity portion may be generated by the AP based on a network coding of the first and second data portions. When the first data portion is received by the STA with errors, the STA may attempt to recover the first data portion using both the parity portion and the second data portion. These embodiments, as well as others, are described in more detail below.

Some embodiments are directed to an access point (AP) configured for transmission of a multi-user physical layer protocol data unit (MU-PPDU) with network coding to two or more stations including a first station (STA1) and one or more other stations including a second station (STA2). In these embodiments, the AP may generate a parity portion of the MU-PPDU by performing network coding on a first data portion of the MU-PPDU and a second data portion of the MU-PPDU. In these embodiments, the AP may encode the MU-PPDU to include a first data portion addressed to the STA1, a second data portion addressed to the STA2, and the parity portion addressed to both the STA1 and the STA2. In these embodiments, the network coding may comprise systematic coding, which may comprise using one of linear packet erasure codes and forward error correction (FEC) codes, although the scope of the embodiments is not limited in this respect. These embodiments, as well as others, are described in more detail below.

Figures 1, 2:
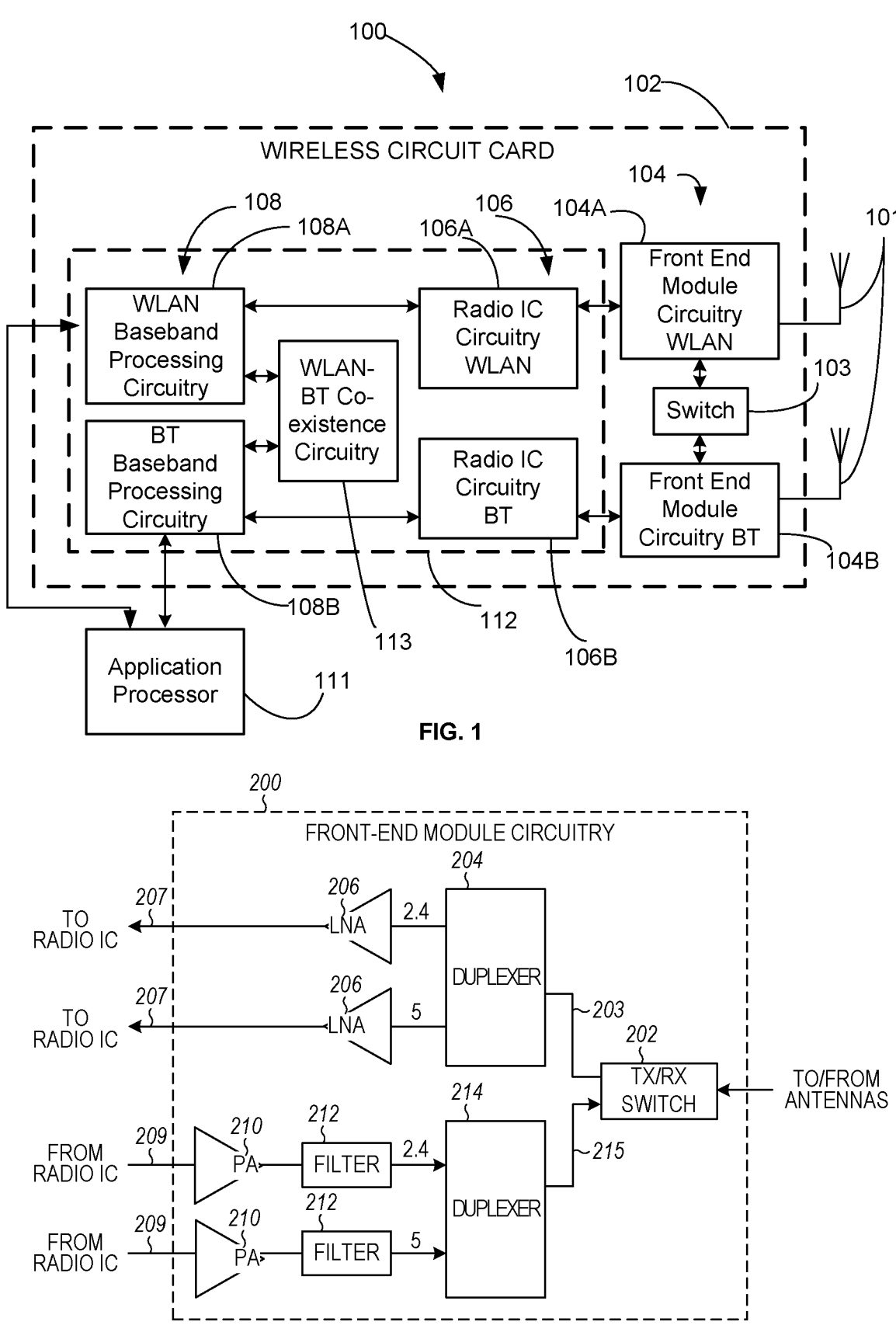
FIG. 1 is a block diagram of a radio architecture, in accordance with some embodiments.
FIG. 2 illustrates a front-end module circuitry for use in the radio architecture of FIG. 1, in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, IEEE 802.11ax, and/or IEEE P802.11be standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In some embodiments, the radio architecture 100 may be configured for Extremely High Throughput (EHT) communications in accordance with the IEEE 802.11be standard. In these embodiments, the radio architecture 100 may be configured to communicate in accordance with an OFDMA technique, although the scope of the embodiments is not limited in this respect. In some embodiments, the radio architecture 100 may be configured for next generation vehicle-to-everything (NGV) communications in accordance with the IEEE 802.11bd standard and one or more stations including AP 502 may be next generation vehicle-to-everything (NGV) stations (STAs).

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards.

In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
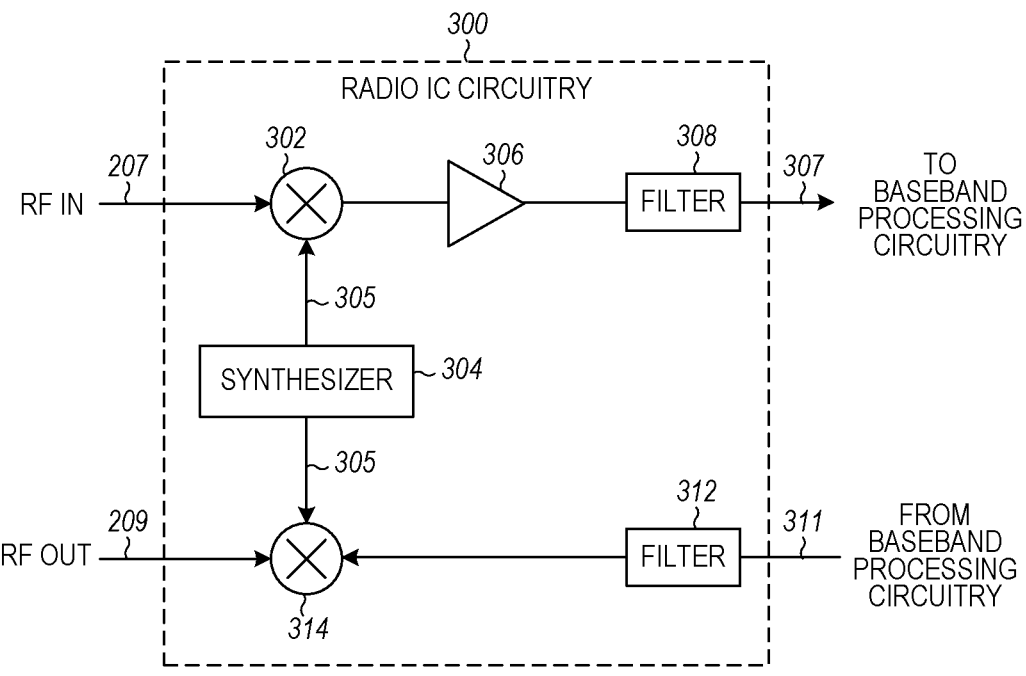
FIG. 3 illustrates a radio IC circuitry for use in the radio architecture of FIG. 1, in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuit 304 may be provided by a voltage controlled oscillator (VCO), although that is not a requirement. A divider control input may further be provided by either the baseband processing circuitry 108 (FIG. 1) or application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
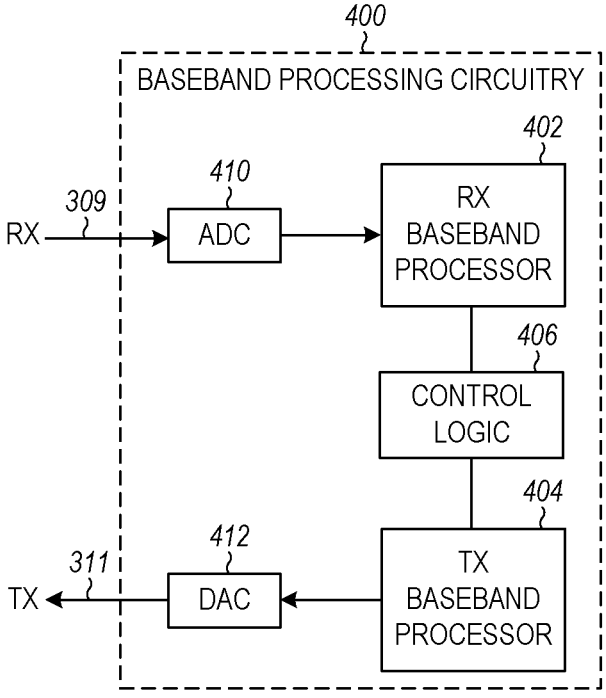
FIG. 4 illustrates a baseband processing circuitry for use in the radio architecture of FIG. 1, in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a pre-amble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
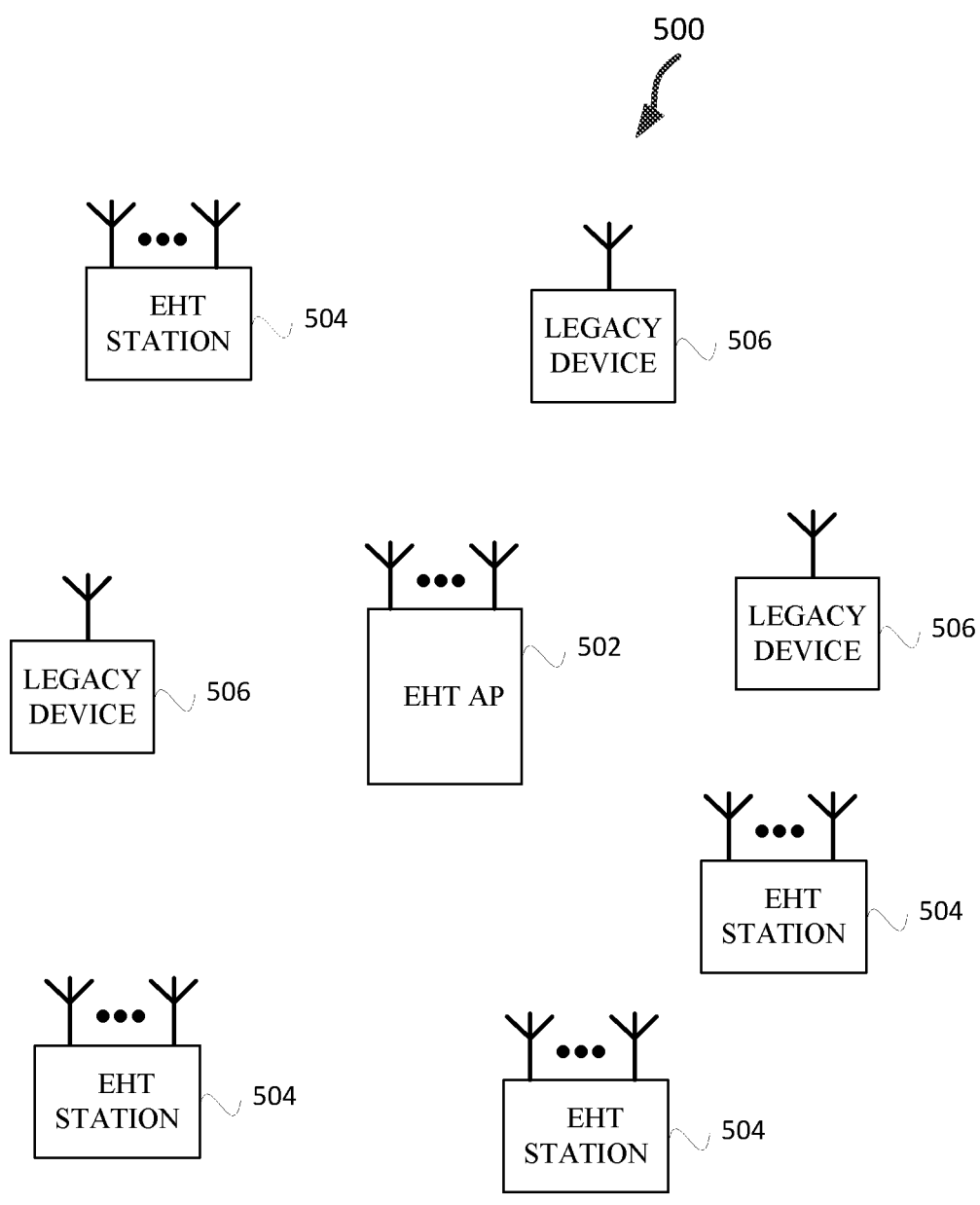
FIG. 5 illustrates a WLAN, in accordance with some embodiments.

FIG. 5 illustrates a WLAN 500 in accordance with some embodiments. The WLAN 500 may comprise a basis service set (BSS) that may include an access point (AP) 502, which may be an AP, a plurality of stations 504, and a plurality of legacy (e.g., IEEE 802.11n/ac/ax) devices 506. In some embodiments, WLAN 500 may be configured for Extremely High Throughput (EHT) communications in accordance with the IEEE 802.11be standard and one or more stations including AP 502 may be EHT STAs. In some embodiments, WLAN 500 may be configured for next generation vehicle-to-everything (NGV) communications in accordance with the IEEE 802.11bd standard and one or more stations including AP 502 may be next generation vehicle-to-everything (NGV) stations (STAs).

The AP 502 may be an AP using the IEEE 802.11 to transmit and receive. The AP 502 may be a base station. The AP 502 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one AP 502 that is part of an extended service set (ESS). A controller (not illustrated) may store information that is common to the more than one APs 502. IEEE P802.11be/D2.0, May 2022 is incorporated herein by reference.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. The STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the STAs 504 may be termed high efficiency (HE) stations.

AP 502 may communicate with legacy devices 506 in accordance with legacy IEEE 802.11 communication techniques. In example embodiments, AP 502 may also be configured to communicate with STAs 504 in accordance with legacy IEEE 802.11 communication techniques.

In some embodiments, a frame may be configurable to have the same bandwidth as a channel. The frame may be a physical Layer Convergence Procedure (PLCP) Protocol Data Unit (PPDU). In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA PPDU formats. In some embodiments, the 106-subcarrier RU is used in the 20 MHz, 40 MHz, 80 MHz, 160 MHz and 80+80 MHz OFDMA and MU-MIMO PPDU formats. In some embodiments, the 242-subcarrier RU is used in the 40 MHz, 80 MHz, 160 MHz and 80+80 MHz OFDMA and MU-MIMO PPDU formats. In some embodiments, the 484-subcarrier RU is used in the 80 MHz, 160 MHz and 80+80 MHz OFDMA and MU-MIMO PPDU formats. In some embodiments, the 996-subcarrier RU is used in the 160 MHz and 80+80 MHz OFDMA and MU-MIMO PPDU formats.

A frame may be configured for transmitting a number of spatial streams, which may be in accordance with MU-MIMO and may be in accordance with OFDMA. In other embodiments, AP 502, STA 504, and/or legacy device 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE and/or EHT communications. In accordance with some IEEE 802.11 embodiments (e.g., IEEE 802.11ax embodiments) a AP 502 may operate as a master station which may be arranged to contend for a wireless medium (e.g., during a contention period) to receive exclusive control of the medium for an control period. In some embodiments, the control period may be termed a transmission opportunity (TXOP). AP 502 may transmit a master-sync transmission, which may be a trigger frame or control and schedule transmission, at the beginning of the control period. AP 502 may transmit a time duration of TXOP and sub-channel information. During the control period, STAs 504 may communicate with AP 502 in accordance with a non-contention based multiple access technique such as OFDMA or MU-MIMO. This is unlike conventional WLAN communications in which devices communicate in accordance with a contention-based communication technique, rather than a multiple access technique. During the control period, the AP 502 may communicate with STAs 504 using one or more frames. During the control period, the STAs 504 may operate on a sub-channel smaller than the operating range of the AP 502. During the control period, legacy stations refrain from communicating. The legacy stations may need to receive the communication from the AP 502 to defer from communicating.

In accordance with some embodiments, during TXOP the STAs 504 may contend for the wireless medium with the legacy devices 506 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The AP 502 may also communicate with legacy stations 506 and/or non-legacy stations 504 in accordance with legacy IEEE 802.11 communication techniques. In some embodiments, the AP 502 may also be configurable to communicate with STAs 504 outside the TXOP in accordance with legacy IEEE 802.11 communication techniques, although this is not a requirement.

In some embodiments station 504 may be a "group owner" (GO) for peer-to-peer modes of operation. A wireless device may be a Station 502 or a AP 502.

In some embodiments, the station 504 and/or AP 502 may be configured to operate in accordance with IEEE 802.11mc. In example embodiments, the radio architecture of FIG. 1 is configured to implement the station 504 and/or the AP 502. In example embodiments, the front-end module circuitry of FIG. 2 is configured to implement the station 504 and/or the AP 502. In example embodiments, the radio IC circuitry of FIG. 3 is configured to implement the station 504 and/or the AP 502. In example embodiments, the base-band processing circuitry of FIG. 4 is configured to implement the station 504 and/or the AP 502.

In example embodiments, the Stations 504, AP 502, an apparatus of the Stations 504, and/or an apparatus of the AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein.

In example embodiments, the station 504 and/or the AP 502 are configured to perform the methods and operations/ functions described herein. In example embodiments, an apparatus of the station 504 and/or an apparatus of the AP 502 are configured to perform the methods and functions described herein. The term Wi-Fi may refer to one or more of the IEEE 802.11 communication standards. AP and STA may refer to access point 502 and/or station 504 as well as legacy devices 506.

In some embodiments, a AP STA may refer to a AP 502 and a STAs 504 that is operating a APs 502. In some embodiments, when an STA 504 is not operating as a AP, it may be referred to as a non-AP STA or non-AP. In some embodiments, STA 504 may be referred to as either a AP STA or a non-AP.

Figure 6:
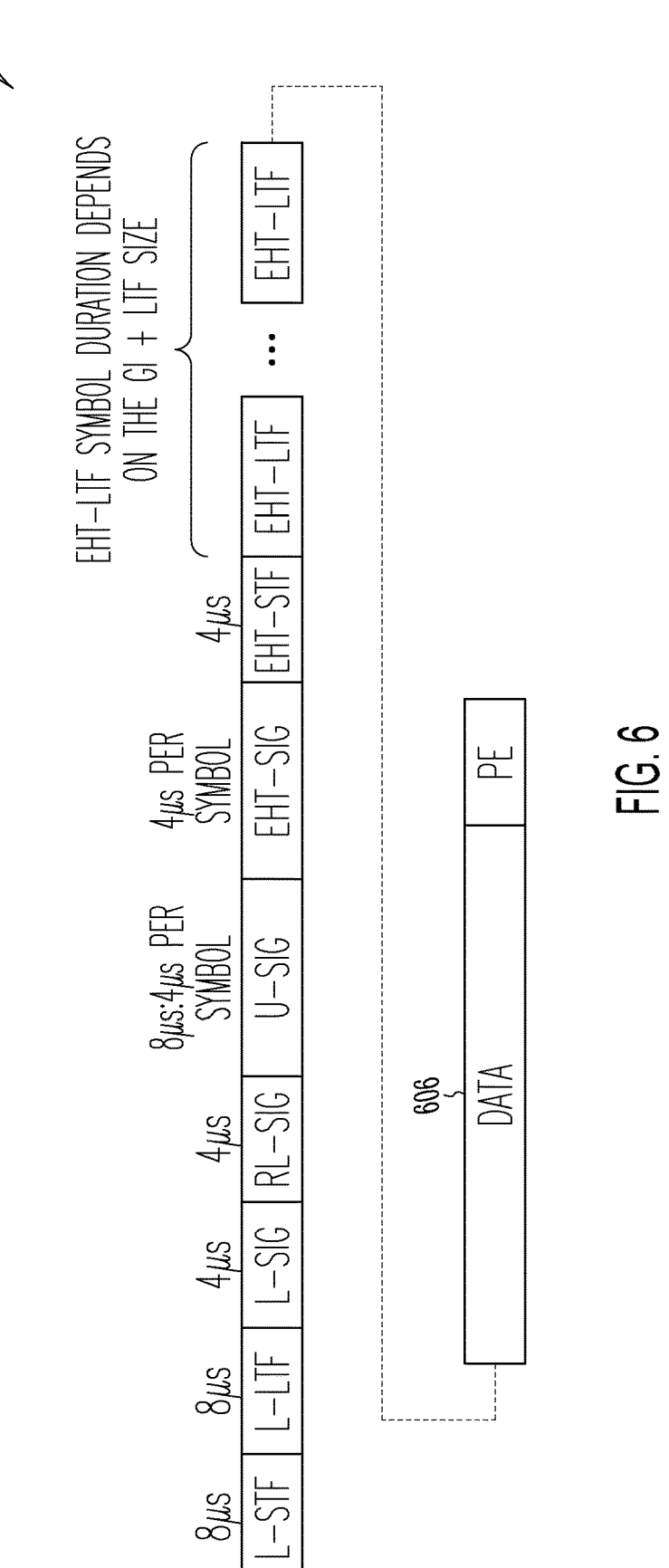
FIG. 6 illustrates an EHT PPDU format, in accordance with some embodiments.

FIG. 6 illustrates an EHT MU PPDU format, in accordance with some embodiments. The EHT MU PPDU format 600 may be used for transmission to one or more user STAs. This EHT PPDU is not used in response to a triggering frame. The data field 606 carries the PSDU(s), which may comprise one or more data portions for one or more user STAs.

In these embodiments, the RL-SIG, U-SIG, EHT-STF, EHT-LTF, and PE fields are present in the two EHT PPDU formats. The EHT-SIG field is present only in the EHT MU PPDU. The L-STF, L-LTF, L-SIG, RL-SIG, U-SIG, and EHT-SIG fields are referred to as pre-EHT modulated fields, while the EHT-STF, EHT-LTF, Data, and PE fields are referred to as the EHT modulated fields.

Both the pre-EHT modulated fields as well as the EHT modulated files of the EHT MU PPDU format 600 may be sent on each 20 MHz channel. This is unlike an EHT TB PPDU in which the pre-EHT modulated fields, which include L-STF, L-LTF, L-SIG, RL-SIG, and U-SIG fields, are sent only on the 20 MHz channels where the STA's EHT modulated fields are present. If the STA's EHT modulated fields occupy more than one 20 MHz channel, the pre-EHT modulated fields are duplicated over multiple 20 MHz channels.

In some embodiments, a physical layer protocol data unit may be a physical layer conformance procedure (PLCP) protocol data unit (PPDU). In some embodiments, the AP and STAs may communicate in accordance with one of the IEEE 802.11 standards. IEEE 802.11-2016 is incorporated herein by reference. IEEE P802.11-REVmd/D2.4, August 2019, and IEEE draft specification IEEE P802.11ax/D5.0, October 2019 are incorporated herein by reference in their entireties. In some embodiments, the AP and STAs may be directional multi-gigabit (DMG) STAs or enhanced DMG (EDMG) STAs configured to communicate in accordance with IEEE 802.11ad standard or IEEE draft specification IEEE P802.11ay, February 2019, which is incorporated herein by reference.

Figure 7:
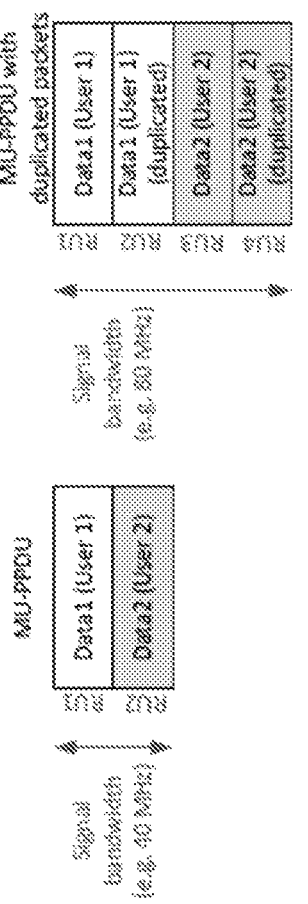
FIG. 7 illustrates MU-PPDU transmission without duplication and MU-PPDU with duplication.

FIG. 7 illustrates MU-PPDU transmission without duplication and MU-PPDU with duplication. In 802.11ax (Wi-Fi 6) and 802.11be (Wi-Fi 7), OFDMA (orthogonal frequency division multiple access) was introduced and in a single PPDU more than one data packet can be delivered to multiple users in different frequency segments in a 20, 40, 80, 160, or 320 MHz channel bandwidth. An RU (resource unit), which is a set of subcarriers, is allocated to each user in a MU PPDU (multi-user PPDU) and data for each user is transmitted in the allocated RU. For each user, other user's data is not relevant, but it can decode the packet of the other user. FIG. 7 is an Illustration of MU-PPDU and MU-PPDU with duplicated packets.

Figure 8:
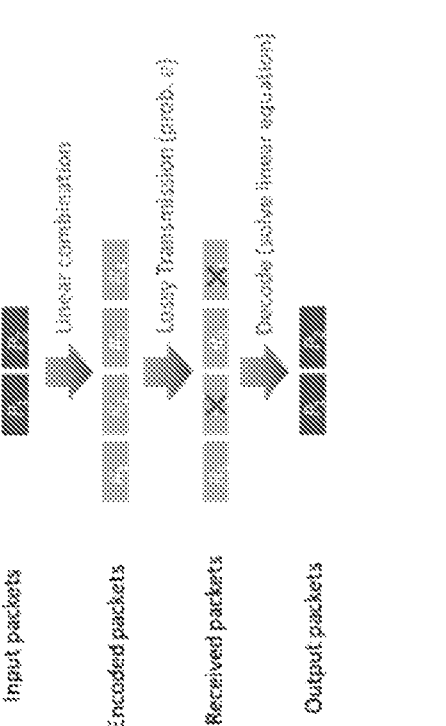
FIG. 8 illustrates network coding of two packets, in accordance with some embodiments.

FIG. 8 illustrates network coding of two packets, in accordance with some embodiments. As illustrated in FIG. 8:

Input packets: $P_1, P_2, \ldots, P_k$

As column vectors over finite field $\mathbb{F}$

Encoding: $R_j = \sum_{i=1}^{k} c_{ij} P_i, \, c_{ij} \in \mathbb{F}$ $[R_1, R_2, \ldots, R_n] = [P_1, P_2, \ldots, P_k][c_{ij}]_{k \times n}$     (1)

Packet loss: delete columns of $[c_{ij}]$

Decoding: solve linear equations

Recover $[P_1, P_2, \ldots, P_k]$ if $\geq k$ encoded packets recieved

FIG. 8 illustrates the use of a non-systematic code in which R1–R4 are all linear combinations of P1 and P2. In some embodiments, a systematic code may be used. In these embodiments, R1 represents the first data portion, R2 represents the second data portion and R3 and R4 represent parity portions. In these embodiments, network coding may include using network codes, such as: linear packet erasure codes and forward error correction codes, although the scope of the embodiments is not limited in this respect. A systematic code may be any error-correcting code in which the input data is embedded in the encoded output. In a non-systematic code, the output does not contain the input.

Figure 9:
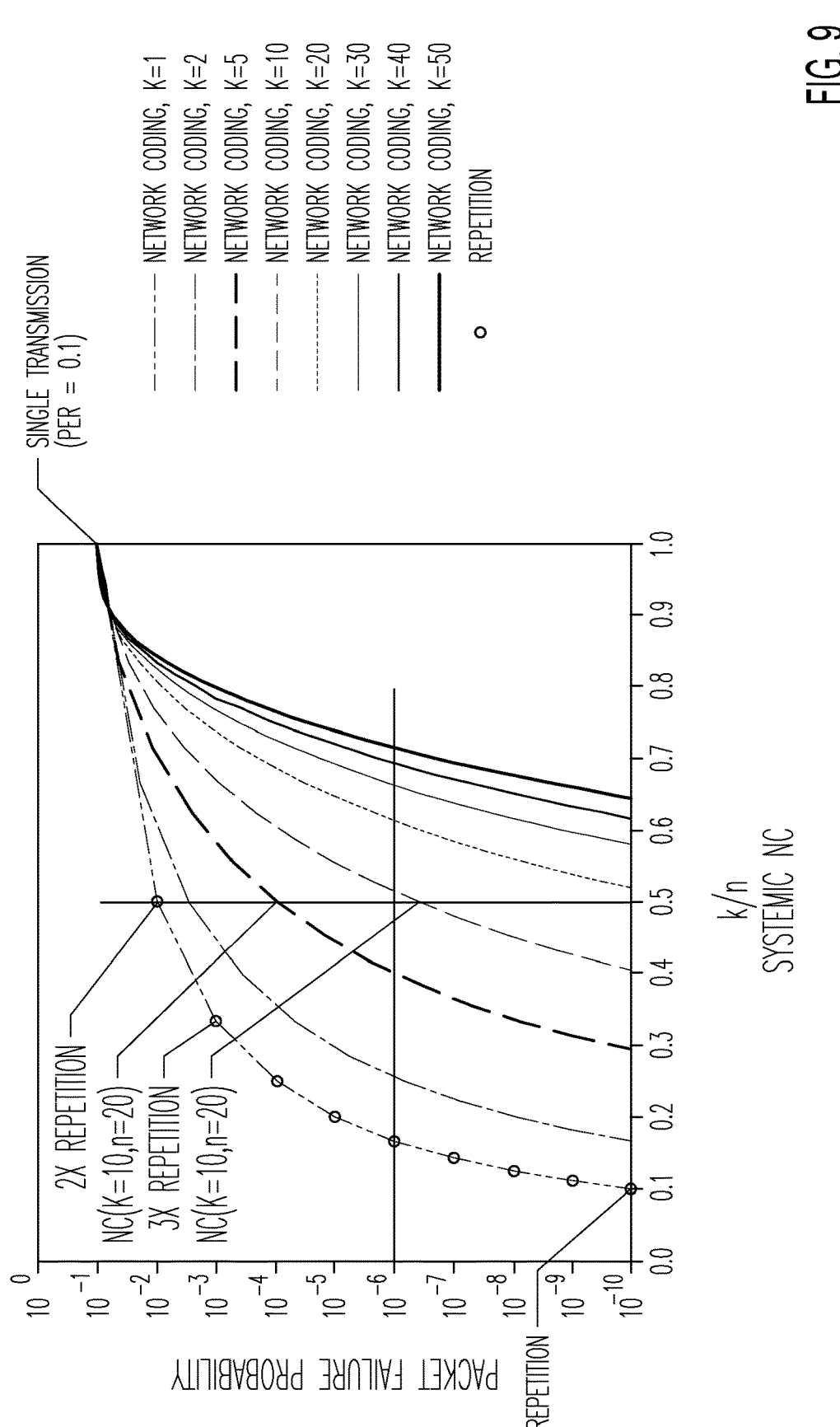
FIG. 9 illustrates packet error rate vs. spectral efficiency for network coding and repetition, in accordance with some embodiments.

Network coding provides much better Rate-Reliability trade-off than repetition, and this trade-off improves with increasing coding group size (k). FIG. 9 illustrates packet error rate vs. spectral efficiency for network coding and repetition, in accordance with some embodiments. FIG. 9 compares the packet error rate vs. spectral efficiency for network coding and repetition, assuming single packet transmission error happens with probability 0.1. FIG. 9 illustrates performance of network coding when a systematic code is used, although the scope of the embodiments is not limited in this respect.

A previous solution was to retransmit lost packets or transmitting multiple duplicate packets to increase reliability. Added latency due to retransmissions and increased overhead and reduced spectral efficiency for packet duplication. Instead of adding duplicate packets to enhance reliability, some embodiments use other user's data packet as a parity packet for better spectral efficiency with increased reliability. The network coding is applied across multiple users' data packets and parity packets are generated at the transmitter. The parity packets are transmitted with multiple users' data packets in a multi-user PPDU. When a user receives the multi-user PPDU and the data packet of the user has error, the user recovers the data packet using the other users' data packets and the parity packets. Embodiments disclosed herein provide enhanced reliability with higher spectral efficiency compared to the duplicate packet transmissions.

Figures 10, 11:
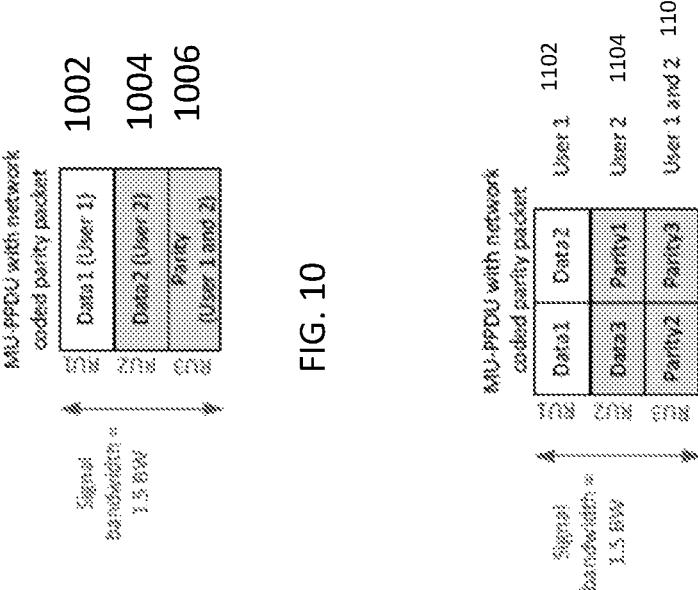
FIG. 10 illustrates MU-PPDU transmission with network coded parity packets, in accordance with some embodiments.
FIG. 11 illustrates MU-PPDU transmission with network coded parity packets, in accordance with some other embodiments.

Transmitter side behavior: At the transmitter (e.g., an AP), when there are multiple data packets to transmit to multiple users in an MU-PPDU, a network coding is applied to k multiple data packets of the same size, which may belong to multiple users. The transmitter may group users at similar distance so that a same MCS can be used for all the users in an MU-PPDU. Depending on the code rate (k/n) of the network coding, (n–k) parity packets are generated. The (n–k) parity packets can be transmitted on a single RU or multiple RUs and aggregated with other user's data packets depending on available frequency and time resources (i.e., signal bandwidth and available TXOP). FIG. 10 illustrates MU-PPDU transmission with network coded parity packets, in accordance with some embodiments. In this example, n=3 and k=2. One parity packet is transmitted in a separate RU in the MU-PPDU. FIG. 10 is an example of a two user case, k=2, n=3. In these embodiments, first data portion (data 1) 1002 addressed to the STA1, second data portion (data 2) 1004 addressed to the STA2, and a parity portion (Parity) 1006 may be transmitted as the data field 606 (FIG. 6) of a MU-PPDU, such as EHT MU PPDU 600 (FIG. 6).

FIG. 11 illustrates MU-PPDU transmission with network coded parity packets, in accordance with some other embodiments. In this example, n=6 and k=3. Two parity packets are transmitted in a separate RU in the MU-PPDU and one parity packet is transmitted together with Data3 in RU2. FIG. 11 illustrates a two user case, k=3, n=6. The Parity1 packet is transmitted together with User 2's data packet. In these embodiments, first data portion (data 1), second data portion (data2), third data portion (data3), as well as first parity portion (parity1), second parity portion (parity2) and third parity portion (parity 3) may be transmitted as the data field 606 (FIG. 6) of a MU-PPDU, such as EHT MU PPDU 600 (FIG. 6).

Receiver side behavior: When a receiver receives a MU-PPDU packet that includes a data packet that is addressed to the receiver and if the receiver can decode the data packet correctly, the receiver forwards the received data packet to the upper layer. When a receiver receives a MU-PPDU packet that includes a data packet(s) that is addressed to the receiver and if the receiver cannot decode the data packet(s) correctly, the receiver decodes k packets of other users' data packets and/or parity packets and reconstructs the lost data packet(s) that was addressed to the receiver.

In some embodiments, The encoded packets may be transmitted in a specific order in time and frequency that is predefined between the transmitter and the receiver. Alternatively, each packet may include a sequence number that indicates the location of the encoded packet in the n encoded packets.

In the example shown in FIG. 10, when the data packet, Data1 (User 1) is lost, the receiver decodes Data2 (User 2) and Parity (User 1 and 2) packets and reconstructs Data1 (User 1) packet. In the example, if we assume each packet has a packet error probability (PER) of p=0.1, the probability that each user's will receive its data packet correctly, Ps, can be calculated as follows: Ps=P(user's data received correctly)+P(user's data has error)P(the other user's data received correctly)P(parity packet received correctly)=(1−p)+p(1−p)2=1−2p2+p3 If we don't add the parity packet in the MU-PPDU, each user's chance to receive its data packet correctly is (1−p), which is much worse than with the parity packet. If we duplicate Data1 (User 1) data only and replace the parity packet with the duplicate of Data1 (User 1) packet, the user 1 will receive its data packet correctly with a probability of (1−p2) but user 2 will not see any improvement of reliability (i.e., success rate is (1−p)). If both users' packets are duplicated, then both packets will have increased reliability of (1−p2) but by using 33.3% more bandwidth than the proposed network coding approach.

Some embodiments are directed to a non-access point (AP) station (STA). In these embodiments, the STA may be configured to operate as a first station (STA1) in a wireless local area network (WLAN) comprising the STA1, an AP STA (AP), and one or more other stations including a second station (STA2). In these embodiments, for receipt of a multi-user physical layer protocol data unit (MU-PPDU) with network coding, the STA1 may decode at least portions of a MU-PPDU (see FIG. 10) received from the AP. In these embodiments, the MU-PPDU may comprise a first data portion (data 1) 1002 addressed to the STA1, a second data portion (data 2) 1004 addressed to the STA2, and a parity portion (Parity) 1006 addressed to both the STA1 and the STA2. In these embodiments, the parity portion may be generated by the AP based on a network coding of the first and second data portions. In these embodiments, when the first data portion 1002 is received by the STA1 with errors (i.e., the first data portion 1002 is unable to be properly decoded), the STA1 may attempt to recover the first data portion 1002 using both the parity portion 1006 and the second data portion 1004.

In some embodiments, to recover the first data portion 1002 when the first data portion 1002 is received by the STA1 with errors, the STA1 may decode both the parity portion 1006 and the second data portion 1004 and reconstruct the first data portion based on the decoded parity portion and the decoded second data portion. In these embodiments, the reconstructed first data portion may be forwarded to an upper layer of the STA1.

In some embodiments, the network coding comprises systematic coding comprising one of linear packet erasure codes and forward error correction (FEC) codes. In these embodiments, the AP may generate the parity portion by performing systematic coding on the input packets using one of linear packet erasure codes and forward error correction (FEC) codes to generate the encoded parity packet (i.e., parity portion 1006). In some other embodiments, a non-systematic code may be used, although the scope of the embodiments is not limited in this respect.

In some embodiments, when the first data portion 1002 is received by the STA1 without errors (i.e., is able to be properly decoded), the decoded first data portion may be forwarded to the upper layer and the STA1 may refrain from decoding the parity portion 1006 and the second data portion 1004.

In some embodiments, the first data portion may be received from the AP on a first resource unit (RU) (RU1), the second data portion may be received from the AP the AP on a second RU (RU2), and the parity portion may be received from the AP on a third RU (RU3) (see FIG. 10). In these embodiments, the first, second and third RUs may comprise a multi-user data field 606 (see FIG. 6) of the MU-PPDU. IN these embodiments, the MU-PPDU may be configured in accordance an EHT MU PPDU format 600 including an EHT-SIG field that identifies the RUs for each station, although the scope of the embodiments is not limited in this respect. In some of these embodiments, the first and second data portions and parity portion may be transmitted by the AP concurrently (i.e., on the three different RUs which overlap in time).

In some embodiments, the first RU, the second RU and the third RU may have equal signal bandwidths (e.g., 20 MHz). In these embodiments, the first RU may comprise a first set of subcarriers, the second RU may comprise a second set of subcarriers, and the third RU may comprise a third set of subcarriers. An example of this is illustrated in FIG. 10. In these embodiments, the signal bandwidth is no more than 1.5× the signal bandwidth of the first and second RUs. This is unlike duplicate data transmission requires twice (2×) the signal bandwidth. An example of duplicate data transmission is illustrated in FIG. 7.

In some embodiments, the MU-PPDU may comprise k data portions and n–k parity portions for a total of n data and parity portions. In these embodiments, the parity portions may be generated by the AP network coded based on a coding rate of k/n. In some embodiments, k may range from two to 10 s (e.g., up to 100) of packets, and n may be equal to twice K for a code rate of ½, although the scope of the embodiments is not limited in this respect. In these embodiments, k is the coding group size. In these embodiments, the network coding provides much better Rate-Reliability trade-off than repetition or duplication, and this trade-off improves with increasing coding group size (k), as illustrated in FIG. 9.

In some embodiments, the MU-PPDU may be received from the AP and may be configured in a non-duplicate format (i.e., data portions are not duplicated).

In some embodiments, the MU-PPDU may comprise a first A-MPDU 1102 (see FIG. 11) on a first resource unit (RU) (RU1), a second A-MPDU 1104 on a second RU (RU2), and a third A-MPDU 1106 on a third RU (RU3). In these embodiments, the first A-MPDU 1102 may comprise the first data portion (data1) and a third data portion (shown as data2 in FIG. 11) for the STA1. In these embodiments, the second A-MPDU 1104 may comprise the second data portion (shown as data3 in FIG. 11) and the first parity portion (parity 1). In these embodiments, the third A-MPDU 1106 may comprise a second parity portion (parity2) and third parity portion (parity3). In these embodiments, the first, second and third parity portions may be generated by network coding of the first, second and third data portions. In these embodiments, the first, second and third RUs may comprise a multi-user data field 606 (see FIG. 6) of the MU-PPDU. In these embodiments, the MU-PPDU may be configured in accordance an EHT MU PPDU format 600 including an EHT-SIG field that identifies the RUs for each station.

In some embodiments, to recover either the first data portion or the second data portion of the first A-MPDU 1102, the STA1 may be configured to decode the first, second and third parity portions and the second data portion (data3) and reconstruct either the first data portion or the second data portion based on the decoded parity portions and the decoded second data portion. In these embodiments, the reconstructed first or second data portion may be forwarded to an upper layer of the STA1. In some embodiments, memory of the STA1 may be configured to store one or more fields of the MU-PPDU.

Some embodiments are directed to a non-transitory computer-readable storage medium that stores instructions for execution by processing circuitry of a non-access point (AP) station (STA) configured to operate as a first station (STA1) in a wireless local area network (WLAN).

Some embodiments are directed to an access point (AP). In these embodiments, the AP may be configured for transmission of a multi-user physical layer protocol data unit (MU-PPDU) with network coding to two or more stations including a first station (STA1) and one or more other stations including a second station (STA2). In these embodiments, the AP may generate a parity portion (Parity) 1006 of the MU-PPDU by performing network coding on a first data portion (data 1) 1002 of the MU-PPDU and a second data portion (data 2) 1004 of the MU-PPDU. In these embodiments, the AP may encode the MU-PPDU to include a first data portion addressed to the STA1, a second data portion addressed to the STA2, and the parity portion addressed to both the STA1 and the STA2. In these embodiments, the network coding may comprise systematic coding, which may comprise using one of linear packet erasure codes and forward error correction (FEC) codes.

In some embodiments, the network coding may be configured to allow the STA1 to recover the first data portion 1002 using both the parity portion 1006 and the second data portion 1004 when the STA1 receives the first data portion

1002 with errors. In these embodiments, the network coding may also be configured to allow the STA2 to recover the second data portion 1004 using both the parity portion 1006 and the first data portion 1002 when the STA2 receives the second data portion 1004 with errors.

In some embodiments, the first data portion may be transmitted by the AP on a first resource unit (RU) (RU1), the second data portion may be transmitted by the AP the AP on a second RU (RU2), and the parity portion may be transmitted by the AP on a third RU (RU3) (see FIG. 10). In these embodiments, the first, second and third RUs may comprise a multi-user data field 606 (see FIG. 6) of the MU-PPDU. In these embodiments, the MU-PPDU may be configured in accordance an EHT MU PPDU format 600 including an EHT-SIG field that identifies the RUs for each station, although the scope of the embodiments is not limited in this respect. In some embodiments, the first RU, the second RU and the third RU may have equal signal bandwidths (e.g., 20 MHz) and the first RU may comprise a first set of subcarriers, the second RU may comprise a second set of subcarriers, and the third RU may comprise a third set of subcarriers.

Figure 12:
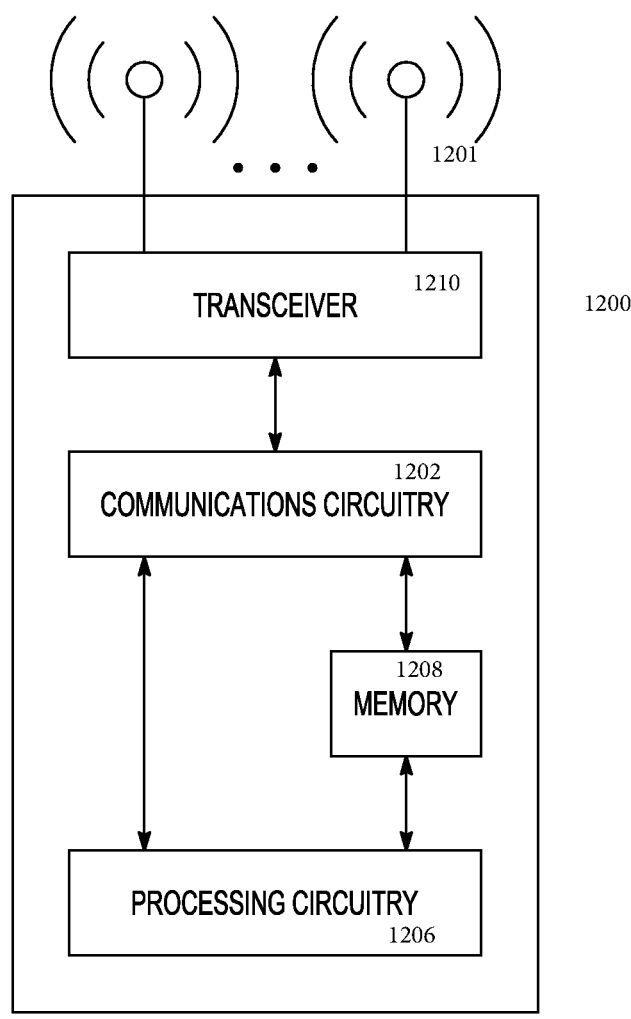
FIG. 12 is a function block diagram of a wireless communication device in accordance with some embodiments.

FIG. 12 illustrates a functional block diagram of a wireless communication device, in accordance with some embodiments. In some embodiments, FIG. 12 illustrates a functional block diagram of a communication device (STA) that may be suitable for use as an AP STA, a non-AP STA or other user device in accordance with some embodiments. The communication device 1200 may also be suitable for use as a handheld device, a mobile device, a cellular telephone, a smartphone, a tablet, a netbook, a wireless terminal, a laptop computer, a wearable computer device, a femtocell, a high data rate (HDR) subscriber device, an access point, an access terminal, or other personal communication system (PCS) device.

The communication device 1200 may include communications circuitry 1202 and a transceiver 1210 for transmitting and receiving signals to and from other communication devices using one or more antennas 1201. The communications circuitry 1202 may include circuitry that can operate the physical layer (PHY) communications and/or medium access control (MAC) communications for controlling access to the wireless medium, and/or any other communications layers for transmitting and receiving signals. The communication device 1200 may also include processing circuitry 1206 and memory 1208 arranged to perform the operations described herein. In some embodiments, the communications circuitry 1202 and the processing circuitry 1206 may be configured to perform operations detailed in the above figures, diagrams, and flows.

In accordance with some embodiments, the communications circuitry 1202 may be arranged to contend for a wireless medium and configure frames or packets for communicating over the wireless medium. The communications circuitry 1202 may be arranged to transmit and receive signals. The communications circuitry 1202 may also include circuitry for modulation/demodulation, upconversion/downconversion, filtering, amplification, etc. In some embodiments, the processing circuitry 1206 of the communication device 1200 may include one or more processors. In other embodiments, two or more antennas 1201 may be coupled to the communications circuitry 1202 arranged for sending and receiving signals. The memory 1208 may store information for configuring the processing circuitry 1206 to perform operations for configuring and transmitting message frames and performing the various operations described herein. The memory 1208 may include any type of memory, including non-transitory memory, for storing information in a form readable by a machine (e.g., a computer). For example, the memory 1208 may include a computer-readable storage device, read-only memory (ROM), random-access memory (RAM), magnetic disk storage media, optical storage media, flash-memory devices and other storage devices and media.

In some embodiments, the communication device 1200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 1200 may include one or more antennas 1201. The antennas 1201 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the communication device 1200 may include one or more of a keyboard, a display, a non-volatile memory port, multiple antennas, a graphics processor, an application processor, speakers, and other mobile device elements. The display may be an LCD screen including a touch screen.

Although the communication device 1200 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 1200 may refer to one or more processes operating on one or more processing elements.

Figure 13:
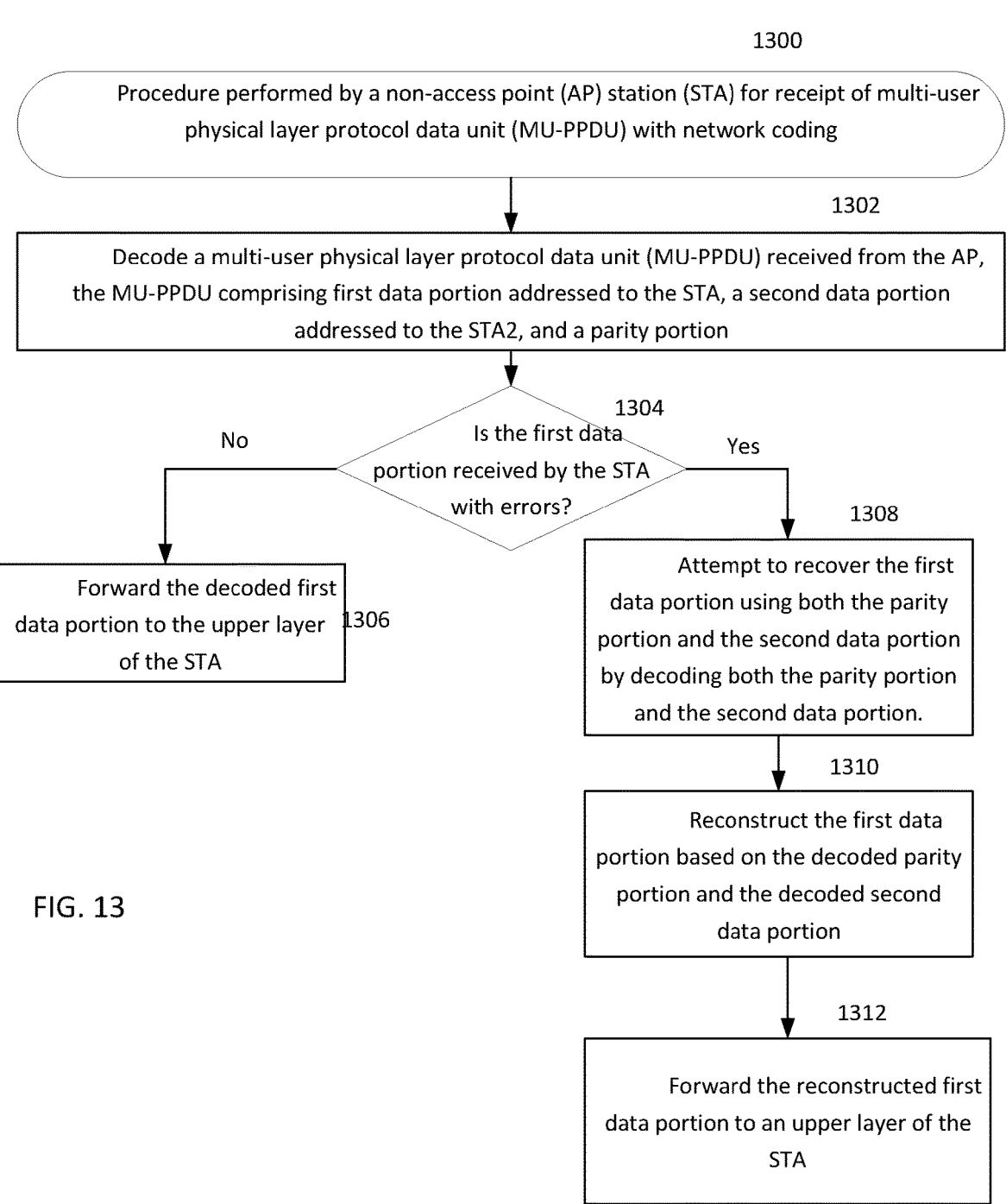
FIG. 13 illustrates a procedure 1300 performed by a non-access point (AP) station (STA) for receipt of multi-user physical layer protocol data unit (MU-PPDU) with network coding, in accordance with some embodiments.

FIG. 13 illustrates a procedure 1300 performed by a non-access point (AP) station (STA) for receipt of multi-user physical layer protocol data unit (MU-PPDU) with network coding, in accordance with some embodiments. In operation 1302, the STA may decode a multi-user physical layer protocol data unit (MU-PPDU) received from the AP. The MU-PPDU may comprise first data portion addressed to the STA, a second data portion addressed to the STA2, and a parity portion.

In operation 1304, the STA may determine whether the first data portion is received by the STA with errors? When the first data portion is not received with errors, the processing circuitry of the STA may forward the decoded first data portion to the upper layer of the STA in operation 1306.

When the first data portion is received with errors, the processing circuitry of the STA may attempt to recover the first data portion using both the parity portion and the second data portion by decoding both the parity portion and the second data portion in operation 1308. In operation 1310, the STA may reconstruct the first data portion based on the decoded parity portion and the decoded second data portion. In 1312, if the first data portion is successfully reconstructed, the processing circuitry of the STA may forward the reconstructed first data portion to an upper layer of the STA.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a non-access point station (STA), the apparatus comprising: processing circuitry; and memory,
the processing circuitry to configure the STA to operate as a first station (STA1) in a wireless local area network (WLAN) comprising the STA1, an Access Point (AP), and one or more other stations including a second station (STA2),
wherein for receipt of a multi-user physical layer protocol data unit (MU-PPDU) with network coding, the processing circuitry configured to:
decode the MU-PPDU received from the AP, the MU-PPDU comprising first data portion addressed to the STA1, a second data portion addressed to the STA2, and a parity portion addressed to both the STA1 and the STA2, the parity portion based on a network coding of the first and second data portions,
wherein when the first data portion is received by the STAI with errors, the processing circuitry is configured to recover the first data portion using both the parity portion and the second data portion,
wherein the memory is configured to store one or more fields of the MU-PPDU.

2. The apparatus of claim 1, wherein to recover the first data portion when the first data portion is received by the STA1 with errors, the processing circuitry is configured to:
decode both the parity portion and the second data portion;
reconstruct the first data portion based on the decoded parity portion and the decoded second data portion; and
forward the reconstructed first data portion to an upper layer.

3. The apparatus of claim 2, wherein the network coding comprises systematic coding comprising one of linear packet erasure codes and forward error correction (FEC) codes.

4. The apparatus of claim 3, wherein when the first data portion is received by the STA1 without errors, the processing circuitry is configured forward the decoded first data portion to the upper layer.

5. The apparatus of claim 4, wherein the first data portion is received from the AP on a first resource unit (RU) (RU1), the second data portion is received from the AP on a second RU (RU2), and the parity portion is received from the AP on a third RU (RU3),
wherein the first, second and third RUs comprise a multi-user data field of the MU-PPDU, the MU-PPDU configured in accordance an Extremely-High Throughout (EHT) MU PPDU format including an EHT-SIG field that identifies the RUs for each station.

6. The apparatus of claim 5, wherein the first RU, the second RU and the third RU have equal signal bandwidths, the first RU comprising a first set of subcarriers, the second RU comprising a second set of subcarriers, the third RU comprising a third set of subcarriers.

7. The apparatus of claim 5, wherein the MU-PPDU comprises k data portions and n-k parity portions for a total of n data and parity portions, the parity portions being network coded based on a coding rate of k/n.

8. The apparatus of claim 7, wherein the MU-PPDU is received from the AP and is configured in a non-duplicate format.

9. The apparatus of claim 1, wherein the MU-PPDU comprises a first Aggregated Medium Access Control (MAC) Protocol Data Unit (A-MPDU) on a first resource unit (RU) (RU1), a second A-MPDU on a second RU (RU2), and a third A-MPDU on a third RU (RU3),
wherein the first A-MPDU comprises the first data portion and a third data portion for the STA1;
wherein the second A-MPDU comprises the second data portion and the first parity portion;
wherein the third A-MPDU comprises a second parity portion and third parity portion,
wherein the first, second and third parity portions are generated by network coding of the first, second and third data portions, and
wherein the first, second and third RUs comprise a multi-user data field of the MU-PPDU, the MU-PPDU configured in accordance an Extremely-High Through-out (EHT) MU PPDU format including an EHT-SIG field that identifies the RUs for each station.

10. The apparatus of claim 9, wherein to recover either the first data portion or the second data portion of the first A-MPDU, the processing circuitry is configured to:
decode the first, second and third parity portions and the second data portion;
reconstruct either the first data portion or the second data portion based on the decoded parity portions and the decoded second data portion; and
forward the reconstructed first or second data portion to an upper layer.

11. A non-transitory computer-readable storage medium that stores instructions for execution by processing circuitry of a non-access point station (STA) configured to operate as a first station (STA1) in a wireless local area network (WLAN) comprising the STA1, an Access Point (AP), and one or more other stations including a second station (STA2),
wherein for receipt of a multi-user physical layer protocol data unit (MU-PPDU) with network coding, the processing circuitry configured to:
decode the MU-PPDU received from the AP, the MU-PPDU comprising first data portion addressed to the STA1, a second data portion addressed to the STA2, and a parity portion addressed to both the STA1 and the STA2, the parity portion based on a network coding of the first and second data portions,
wherein when the first data portion is received by the STAI with errors, the processing circuitry is configured to recover the first data portion using both the parity portion and the second data portion.

12. The non-transitory computer-readable storage medium of claim 11, wherein to recover the first data portion when the first data portion is received by the STA1 with errors, the processing circuitry is configured to:

decode both the parity portion and the second data portion;

reconstruct the first data portion based on the decoded parity portion and the decoded second data portion; and forward the reconstructed first data portion to an upper layer.

13. The non-transitory computer-readable storage medium of claim 12, wherein the network coding comprises systematic coding comprising one of linear packet erasure codes and forward error correction (FEC) codes.

14. The non-transitory computer-readable storage medium of claim 13, wherein when the first data portion is received by the STA1 without errors, the processing circuitry is configured forward the decoded first data portion to the upper layer.

15. The non-transitory computer-readable storage medium of claim 14, wherein the first data portion is received from the AP on a first resource unit (RU) (RU1), the second data portion is received from the AP the AP on a second RU (RU2), and the parity portion is received from the AP on a third RU (RU3), wherein the first, second and third RUs comprise a multi-user data field of the MU-PPDU, the MU-PPDU configured in accordance an Extremely-High Throughout (EHT) MU PPDU format including an EHT-SIG field that identifies the RUs for each station.

16. The non-transitory computer-readable storage medium of claim 15, wherein the first RU, the second RU and the third RU have equal signal bandwidths, the first RU comprising a first set of subcarriers, the second RU comprising a second set of subcarriers, the third RU comprising a third set of subcarriers.

17. An apparatus for an access point (AP), the apparatus comprising: processing circuitry; and memory, wherein for transmission of a multi-user physical layer protocol data unit (MU-PPDU) with network coding to two or more stations including a first station (STA1) and one or more other stations including a second station (STA2), the processing circuitry configured to:

generate a parity portion of the MU-PPDU by performing network coding on a first data portion of the MU-PPDU and a second data portion of the MU-PPDU;

encode the MU-PPDU to include a first data portion addressed to the STA1, a second data portion addressed to the STA2, and the parity portion addressed to both the STA1 and the STA2, wherein the network coding comprises systematic coding comprising one of linear packet erasure codes and forward error correction (FEC) codes, and wherein the memory is configured to store one or more fields of the MU-PPDU.

18. The apparatus of claim 17, wherein the network coding is configured to:

allow the STA1 to recover the first data portion using both the parity portion and the second data portion when the STA1 receives the first data portion with errors; and allow the STA2 to recover the second data portion using both the parity portion and the first data portion when the STA2 receives the second data portion with errors.

19. The apparatus of claim 18 wherein the first data portion is transmitted by the AP on a first resource unit (RU) (RU1), the second data portion is transmitted by the AP on a second RU (RU2), and the parity portion is transmitted by the AP on a third RU (RU3), wherein the first, second and third RUs comprise a multi-user data field of the MU-PPDU, the MU-PPDU configured in accordance an Extremely-High Throughout (EHT) MU PPDU format including an EHT-SIG field that identifies the RUs for each station.

20. The apparatus of claim 19, wherein the first RU, the second RU and the third RU have equal signal bandwidths, the first RU comprising a first set of subcarriers, the second RU comprising a second set of subcarriers, the third RU comprising a third set of subcarriers.

* * * * *